Dec. 16, 1924. Re. 15,968

J. H. WARING

PENCIL

Original Filed Feb. 28, 1921

Inventor:
James H. Waring,
by Wallace R. Lane Atty.

Reissued Dec. 16, 1924. Re. 15,968

UNITED STATES PATENT OFFICE.

JAMES H. WARING, OF MILWAUKEE, WISCONSIN, ASSIGNOR, BY MESNE ASSIGNMENTS, TO THE WAHL COMPANY, OF CHICAGO, ILLINOIS, A CORPORATION OF DELAWARE.

PENCIL.

Original No. 1,430,204, dated September 26, 1922, Serial No. 448,318, filed February 28, 1921. Application for reissue filed September 13, 1924. Serial No. 737,570.

*To all whom it may concern:*

Be it known that I, JAMES H. WARING, a citizen of the United States of America, and resident of Milwaukee, county of Milwaukee, and State of Wisconsin, have invented certain new and useful Improvements in Pencils, of which the following is a specification.

Figure 1:
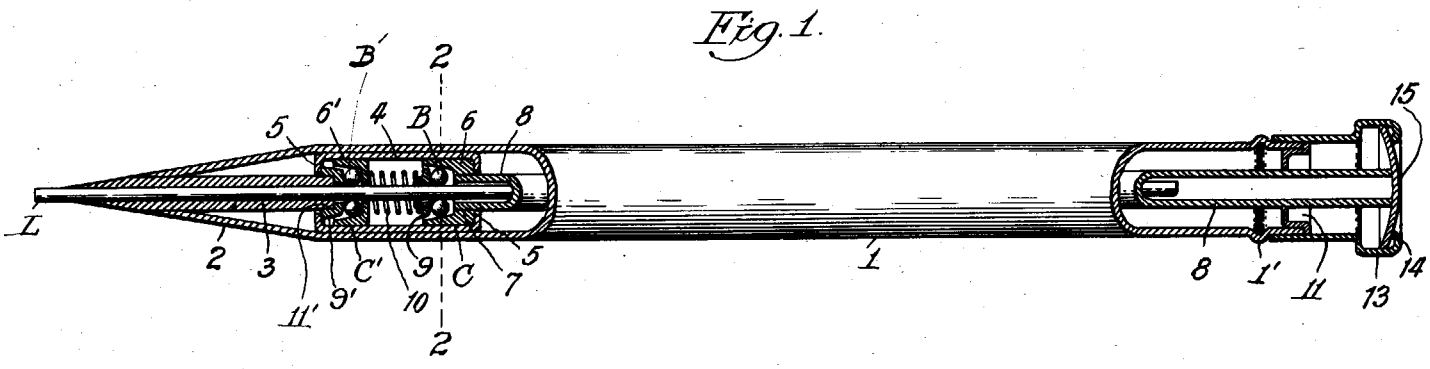
Figure 2:
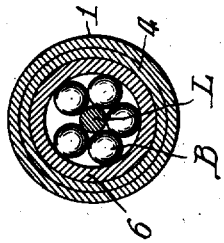

My invention relates to improvements in pencils of the refillable type and among the objects of my invention are to provide a pencil of this type which is durable, efficient and positive in operation; which provides ball clutches for positively feeding the lead forwardly through the tip of the pencil and for positively holding or locking the lead from substantial recessional movement; which provides a pair of ball clutches the balls of which are normally arranged so as not to press with maximum pressure or locking contact against the lead, together with means for automatically and alternately moving the balls into locking contact with the lead either to feed the lead forwardly or to prevent its substantial recessional movement; to provide a pencil having a channel for the lead extending therethrough together with ball clutches capable of acting directly upon the lead and co-operative ball operating mechanism for positively locking the balls against the sides of the lead for feeding the lead forwardly step by step or for preventing recessional movement, whereby the usual plunger-feed for the lead is eliminated and continuous automatic feeding of a long lead or a succession of shorter leads through the feed channel is made possible; to provide a pencil having a continuous channel for the lead, and upper and lower ball clutches for positively gripping or releasing the sides of the lead together with means operable from the rear end of the pencil for automatically causing the balls to move into maximum gripping or locked engagement with the lead during forward feeding and automatic means cooperating with said feeding means for causing the balls to move into maximum gripping contact or positive locked engagement with the lead to prevent substantial recessional movement thereof; to provide a pencil having a channel for the lead, and a pair of ball clutches communicating therewith so as to be in position to be positively moved from a position out of locking contact with the lead into such a locking contact position, together with means for causing the longitudinal movement of the lead to cause the locking engagement of the balls with the lead or the shifting of the balls out of such locking engagement; to provide a pencil having a lead channel and a pair of cooperating ball clutches, each of which clutches includes a tapered contact face for the ball whereby the ball is caused to lockingly grip the lead or to be released therefrom; to provide these and other objects of invention which will be hereinafter made apparent from a perusal of the following specification when taken in connection with the accompanying drawings wherein, Fig. 1 is an elevational view of the invention, with parts broken away and in section to more clearly illustrate the novel points of construction, and Fig. 2 is a transverse sectional view through the lead projecting clutch, taken on the line 2—2 of Figure 1.

Referring now more particularly to the accompanying drawing, the numeral 1 designates an outer casing provided with a tapered end 2 having fitted therein by any suitable method, a lead guide 3, provided with a central recess to permit the lead L to pass therethrough. Disposed within the casing 1 adjacent its tapered end 2, is a clutch housing 4, provided with inwardly turned flanges 5 adapted to retain a pair of ball clutches C and C′ which respectively project and hold the lead against retraction.

The clutch C comprises an annular ring 6 slidable within the housing 4 and provided with a tapered ball engaging surface, and a central opening 7 which permits the ring to be mounted upon the end of a lead housing 8. This lead housing 8 preferably extends longitudinally of the pencil and towards the rear end thereof.

Surrounding the lead and disposed within the annular ring 6, are a plurality of gripping balls B, which are retained in their place by a ball retainer 9.

The clutch C′ opposes the clutch C and functions to prevent the retraction or recessional movement of the lead L. It is similarly constructed. This clutch C′ is likewise provided with an annular slidable ring 6′ and a ball retainer 9′ having a recess 11′ to receive the lead guide 3, whereby the ball retainer 9′ of the clutch C′ is stationary. Disposed between the annular ring 6′ of the clutch C′ and the ball retainer 9 of the clutch C, is a spring 10 adapted to render both clutches operative. This spring has an additional function of returning the clutch C to its normal position after the lead has been projected.

The open end of the casing 1 of the pencil is provided with a collar 11, having a central orifice to permit the lead housing 8 to extend therethrough. Fitted over the end of the casing and abutting the annular flange 1′ is a sleeve 12 provided with an enlarged end 13, which end is turned inwardly to provide a retaining bead 14. Confined within the enlarged end 13 is a cap 15 adapted to engage and operate the lead housing 8. This cap has its movement limited in one direction by the bead 14 and in the opposite direction by the shoulder 16 formed between the sleeve and the enlarged end 13.

In the operation of my improved pencil it is manifest that after removing the end cap 12, either a single long lead L or a succession of shorter leads L, one following after the other, can be inserted through the end of this lead housing 8. Upon depressing the cap 15 the housing 8 pushes forward the annular ring 6 rigid on the end thereof so that its inner tapered wall of ring 6 tends to move the balls B inwardly into locking, gripping engagement with the lead L. This inward movement of the balls is assisted by the reaction of the spring 10 pressing against the ball retainer 9. Continued inward movement of the cap 15, presses the annular ring 6 and the balls B, which now are in locking engagement with the lead L, so that the lead L is necessarily fed forwardly. During this forward feeding the spring 10 is compressed and tends to move forwardly the annular ring 6′ of the clutch C′. However, due to the forward feeding of the lead L the balls B′ of the clutch C′ which are contacting with the lead, tend to move forwardly also with the lead, and due to the downwardly tapering surface of the upper face of the ball retainer 9′ and the outwardly tapering inner wall of the annular ring 6′, the balls at the same time tend to move outwardly. Hence the forward feeding movement or the lead L shifts the balls outwardly away from the lead and no positive locking contact of the balls on the lead arises so that the lead is free to feed forwardly. During this slight outward movement of the balls B′ they push against the gradually enlarging walls of ring 6′ which permits the outward movement of the balls. In addition further downward movement of the ball retainer 6′ is checked. Upon the completion of the forward depression of the cap 15 is released and the spring 10 returns the clutch C to its rearward, original position such as shown in Figure 1. Owing to the fact that the balls B of the clutch C are lockingly gripping the lead there is a tendency for these balls to frictionally adhere to the lead and hence to carry the lead backwardly in a sort of recessional movement with the clutch C as the clutch moves rearwardly under the action of this spring 10. This produces a slight rearward or recessional movement of the lead L, and immediately this rearward movement is set up the lead tends to drag the balls B′ of the clutch C′ toward the rear and force them into the narrower portion of the annular ring 6′ of the clutch C′ and since ring 6′ is spring pressed into contact with these balls, the balls will be forced inwardly into positive locking, gripping engagement with the lead. This prevents any further recessional movement of the lead L. At the same time the annular ring 6 of the clutch C is continuing to return under the action of the spring 10 and as the balls B of this upper clutch tend to frictionally adhere to the now positively held lead L the tapering inner surfaces of the annular ring 6 will continue to move upwardly and will release the locking engagement between this annular ring 6 and the balls B so that there will be no further gripping between the clutch C and the lead L,—that is there will be no further feeding grip until the next depression of the cap 15.

It is manifest that the clutch C′ also functions to prevent the substantial recessional movement of the lead L during the act of writing. For instance when writing pressure is put upon the tip of the lead L it tends to create a recessional movement of the lead, and this recessional movement as before described operates to roll or drag the balls B′ rearwardly towards the rear end of the pencil and wedge them into the narrowing portion of the annular ring 6′ of the clutch C′ and thus lock these balls into positive gripping engagement with the lead C to prevent further substantial recessional movement of the lead L. This action takes place under the ordinary writing pressure.

It is manifest that if greater writing pressure be placed on the point of the lead L, both the balls B′, grippingly locked into contact with the lead, and the annular ring 6′, will be forced rearwardly by this excessive rearward pressure on the lead L, the balls B′ and the annular ring 6′ moving as a unit, which rearward movement tends to compress the spring 10 and force the annular ball retainer 9 of the clutch C rearwardly against the balls B of the clutch C and thus wedge them into the narrower portion of the annular ring 6 of clutch C thereby locking also these balls against the lead L. Inasmuch however as the annular ring 6 of the clutch C is positively held by means of the flanges 5 of the housing 4 from further rearward movement, the further recessional movement of the lead L is positively and absolutely stopped. In most cases the writing pressure of the lead L is not sufficient to bring into play the locking function of the upper clutch C so that only the lower clutch C′ operates to hold the lead L from recessional movement during writing.

While I have shown and described one specific method of carrying out my present invention it will be understood that various changes in minor details of construction are contemplated.

Having thus described my invention what I claim as new and desire to secure by letters Patent is:

1. In a pencil, a casing, means movable within the casing for projecting the lead, a sleeve fitted upon one end of the casing and provided with an enlarged end, and a cap movable within the enlarged end of the sleeve and limited by said sleeve so as not to move beyond the end of said sleeve, said cap being operable for actuating said lead projecting means.

2. In a device of the class described, the combination of lead, a lead housing, a ring rigid therewith and having ball engaging surfaces, a group of balls, a ball retainer, a second ring, a second group of balls, said ring having ball engaging surfaces, a spring contacting with said second ring and said retainer, a second ball retainer, a lead guide rigid therewith, a housing for said spring, said rings, said balls, and said retainers limiting the movement of said first mentioned ring, and a casing enveloping said lead housing, said second mentioned housing and said lead guide.

3. In a pencil having a tip, a set of gripping devices in said pencil means for operating said gripping devices to cause them to grip the lead and feed it through the tip, a second set of gripping devices, means permitting said second set of gripping devices to be automatically released from said lead on said lead feeding movement and to cause said second set of gripping devices to automatically grip said lead on a recessional movement of said lead.

4. In a pencil having a lead conduit therein, upper and lower set of balls in said pencil and communicating with said conduit and means for causing said upper set of balls to move into gripping contact with said lead and feed it forward and means including a tapered wall for permitting said lower set of balls to move away from said lead to permit its feed, said second means being constructed and arranged to cause said lower set of balls to move into gripping contact with said lead on recessional movement of said lead.

5. In a pencil, means forming a lead conduit therethrough, two sets of balls, each set being normally out of locking contact with the lead in said conduit, and means for moving one set of balls into locked contact with the lead to feed it forward and for moving the other set of balls into locked contact with said lead upon the termination of said forward feed to prevent the recession of said lead.

6. In a pencil, means forming a lead conduit therethrough, a set of balls, means for operating said balls to cause them to grip the lead and fed it through the tip, a second set of balls, means permitting the automatic release of contacting pressure of said second set of balls on said lead on said feeding movement said means causing said second balls to automatically increase their contacting pressure on said lead on a recessional movement of said lead.

7. In a pencil, means forming a lead conduit therethrough, a set of balls normally out of substantial gripping contact with the lead in said conduit and means constructed and arranged to be moved in one direction to cause the set of balls to grip said lead and feed it forwardly and means to shift said first mentioned means rearwardly and to cause the release of said balls from said lead.

8. In a pencil, means therein forming a lead conduit, two sets of balls spaced apart therein and communicating with said conduit, a first member having a tapering wall adapted to engage the balls of one of said sets, a second member having a tapering wall adapted to engage the balls of the other set, and means causing said first set of balls and said first mentioned member to move relatively to cause said balls to grip the lead to advance it, said other set of balls and said second member being constructed and arranged to move relatively to cause said other set of balls to move into locking contact with said lead on a recessional movement of said lead.

9. In a pencil means forming a lead conduit therein, a pair of ball clutches arranged therein with the balls communicating with said conduit and said balls being shiftable both longitudinally and transversely of the lead in said conduit, means for manually shifting one of said clutches to cause the balls to lock to and feed the lead forwardly and means to return said clutch, said second clutch being constructed and arranged to cause the automatic shifting of the balls thereof into and out of locking engagement with said lead.

10. In a pencil, means forming a continuous lead conduit through said pencil, a pair of ball clutches spaced apart and opening into said conduit, the balls of said clutches being normally out of substantial gripping contact with said lead, means for manually feeding one of said clutches forwardly, means causing the balls thereof to grip the lead to feed the same through the conduit, means to return said clutch to normal position and cause the balls thereof to release from said lead, means for causing the balls of said second clutch to move into substantial gripping contact with said lead on the return of said first clutch to thereby prevent substantial recessional movement of said lead.

11. In a pencil, a casing having an opening at one end for the insertion of a lead, and a tip at the other end for the projection of lead therethrough, means forming a continous lead conduit from said open end to said tip, spaced apart sets of balls disposed in said casing in communication with said conduit and normally arranged out of substantial gripping contact with the lead in said conduit, and means for shifting one set of balls forwardly and to cause said balls to substantially grip the lead to project the lead through the tip and to thereafter return to normal position and means to automatically cause said other set of balls to move into substantial gripping contact with said lead on the return movement of said first set of balls to prevent substantial recession of said lead.

12. In a pencil having a tip and a longitudinally arranged lead channel communicating with said tip, a set of gripping members in said pencil, means for operating said members to cause them to move toward said lead channel to cause the lead to be fed therethrough, a second set of gripping members, means permitting said second set of gripping members to move away from said lead channel during said lead feeding movement and to cause said second set of gripping members to automatically move toward said lead channel on a recessional movement of said lead.

Signed at Milwaukee, Wisconsin, this 6th day of September, 1924.

JAMES H. WARING.